United States Patent [19]

Midland et al.

[11] Patent Number: 4,658,288
[45] Date of Patent: Apr. 14, 1987

[54] BEAM INDEX SYSTEM WITH SWITCHABLE MEMORIES

[75] Inventors: Richard W. Midland, Inverness; Boris Rozansky, Skokie, both of Ill.

[73] Assignee: Zenith Electronics Corporation, Glenview, Ill.

[21] Appl. No.: 893,530

[22] Filed: Aug. 6, 1986

[51] Int. Cl.⁴ .............................................. H04N 9/24
[52] U.S. Cl. ........................................ 358/67; 358/69
[58] Field of Search ............................... 358/67, 69, 70

[56] References Cited

U.S. PATENT DOCUMENTS

| | | | |
|---|---|---|---|
| 4,163,250 | 7/1979 | Tomii et al. | 358/67 X |
| 4,183,053 | 1/1980 | Tomii et al. | 358/67 X |
| 4,281,340 | 7/1981 | Mitamura et al. | 358/67 |
| 4,314,179 | 2/1982 | Tooyama et al. | 358/69 X |
| 4,408,228 | 10/1983 | Midland | 358/67 |
| 4,468,690 | 8/1984 | Midland | 358/67 |

FOREIGN PATENT DOCUMENTS

| | | | |
|---|---|---|---|
| 56-04989 | 1/1981 | Japan | 358/69 |
| 56-52969 | 5/1981 | Japan | 358/67 |

*Primary Examiner*—Howard W. Britton
*Assistant Examiner*—E. Anne Toth

[57] ABSTRACT

A beam index CRT system includes a pair of memories that are selectively operated to store lines of data from a source and to supply stored lines of data to a CRT. A plurality of NOR gates and flip-flops toggle memory addressing means and simultaneously apply appropriate timing signals thereto for controlling the memory writing and reading operations.

5 Claims, 4 Drawing Figures

BEAM INDEX SYSTEM WITH SWITCHABLE MEMORIES

BACKGROUND OF THE INVENTION AND PRIOR ART

This invention relates generally to beam index cathode ray tube (CRT) systems and particularly to apparatus for selecting and applying data from a source of data to an index type CRT.

U.S. Pat. No. 4,468,690 generally describes a beam index color display system including a FIFO memory for receiving data from a character generator or the like and for supplying that data for display on a beam index CRT under control of an index signal. One of the benefits of that patented system is that the character generator or source of data is not "slaved" to the memory. The present invention is directed to an improved version of an index system similar to that described in the patent. Specifically, it has been found that a much more efficient and economical system results when a pair of memories is employed, with each memory being capable of storing a full display line of pixel data or information. The benefits are obtained because the CRT display scanning system has a relatively long retrace time interval during which the electron beam is repositioned for display of the next line of data.

It will be appreciated by those skilled in the art that while normal television type display systems sweep an electron beam across the target or face of the CRT in a horizontal direction, it is envisioned, and indeed in some cases preferred, that the sweep direction be vertical rather than horizontal. Such a change will not affect the invention and systems employing vertical deflection as the primary deflection mode are intended to be encompassed herein.

In a beam index CRT, a single electron beam is scanned across a regular pattern or screen of colored light emissive phosphor strips that are interleaved with stripes of inert material. The back, or gun side, of the screen is "aluminized," that is, coated with a very thin layer of aluminum and strips of emissive material are positioned at regular intervals in overlying relationship to certain ones of the inert stripes. The emissive material, which may comprise a conventional monochrome type P47 phosphor, emits ultraviolet light when impacted by electrons from the electron beam, which light is picked up by a photocell or the like that is generally positioned at the rear and outside of the CRT. The signal developed by the photocell, which may be a photo multiplier tube (PMT), is processed to develop an index signal which, due to its periodicity and the regularity of the color phosphor stripe pattern, enables the position of the electron beam to be monitored in a very precise manner. The developed index signal is used to control application of appropriate video data to the color CRT for display.

The electron beam traces a "line" during its deflection or scan across the face of the CRT. At the beginning of the scan, a start or run-in signal is generated and subsequent emissions from the index strips serve to produce an index signal that locates the beam very precisely with respect to the CRT screen color strips. At the end of each scanned line, a retrace circuit returns the electron beam across the CRT face so that a subsequent line may be produced by scanning the electron beam from a slightly orthogonally displaced position on the CRT. As the electron beam is swept across the face of the CRT, the generated index signal controls the flow of video data that modulates the intensity of the electron beam to produce the desired color video display. Since no shadow mask is involved in a beam index CRT, the index signal is responsible for controlling application of the appropriate color video data for modulating the electron beam when it is positioned to impact a corresponding color phosphor stripe.

Conventionally, a computer, character generator or other source of video information supplies the color video data in a sequential manner. The data is stored as pixels at pixel address locations in a FIFO memory in the display system, and the information is "clocked out" of the memory by the index signal to modulate the electron beam of the CRT. The system does not provide a great deal of processing time and these restraints have an adverse cost impact. With the invention, a pair of addressable memories is utilized, each memory storing a complete scan line of data, and switching means are provided for alternately supplying data from one memory for controlling modulation of the electron beam in the CRT and for loading data into the other memory from a video data source.

OBJECTS OF THE INVENTION

A principal object of the invention is to provide a novel beam index signal system.

Another object of the invention is to provide a beam index system that is less critical in operation.

A further object of the invention is to provide an improved beam index signal system.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
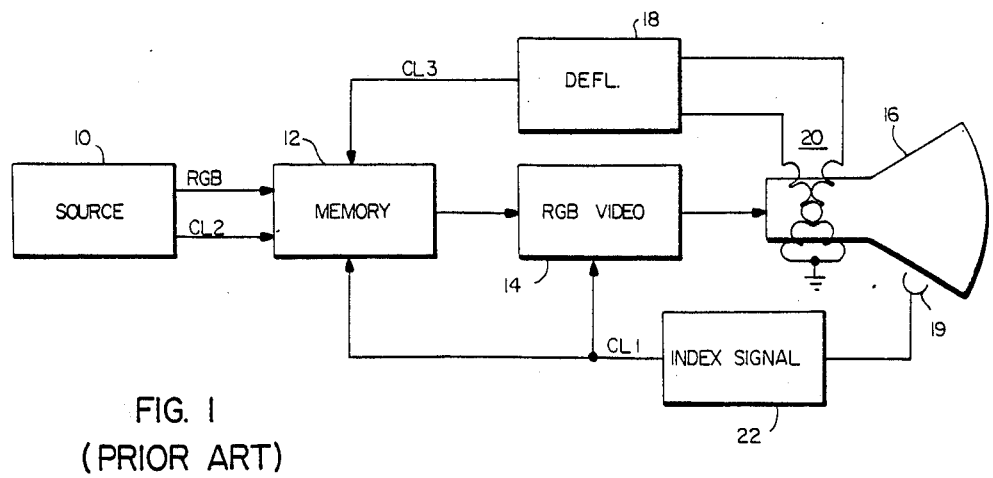
FIG. 1 represents a simplified block diagram of a prior art beam index system.

Referring to FIG. 1, a block diagram of a prior art beam index signal system constructed in accordance with the above-mentioned patent is shown. A source of video information 10 which may comprise a computer, a character generator or any other suitable source of red (R), green (G), and blue (B) video data is shown with an RGB output coupled to a memory 12. Video source 10 also provides a clock signal CL2 to memory 12. Memory 12 stores the data supplied from video source 10 on a line-by-line basis and has an output coupled to an RGB video circuit 14 which, in turn, feeds suitable electrodes of an electron gun (not shown) in a color CRT 16. A deflection circuit 18 develops the necessary scanning potentials for application to a magnetic yoke structure 20, situated on the neck of CRT 16, for deflecting the single electrode beam in CRT 16 in a raster-forming pattern over the face of the CRT. Deflection circuit 18 is shown as developing a clock signal CL3 for application to memory 14. CL3 may be derived from the conventional flyback pulse developed in a typical television receiver type deflection system. Those skilled in the art will recognize that other techniques for deflecting the electron beam across the face of the tube may also be utilized. Thus the clock pulse CL3 should be understood to represent a signal indicative of when the scanning of a "line" on the CRT faceplate begins.

As discussed, a PMT 19 is positioned outside of and to the rear of the envelope of CRT 16 and responds to the ultraviolet light emitted by the index strips therein to supply a signal to index signal source 22 where an index signal is developed in accordance with well-known techniques. The output of index signal source 22 is a clock signal CL1 which is used to control the supply of video data from both memory 12 and RGB video circuit 14. The prior art circuit is well known in the art and described adequately in the above patent and other reference materials.

Figure 2:
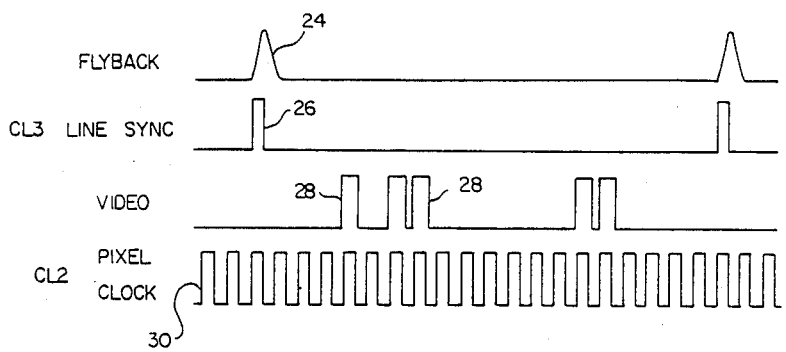
FIG. 2 represents a series of waveforms illustrating an operational feature of the system of FIG. 1.

In FIG. 2, flyback pulses 24 are illustrated, below which are so-called line sync pulses 26 developed in response thereto. The line sync pulses correspond to clock pulse CL3. Below that is a video waveform illustrating pulses 28 of video data and below that is a pixel clock waveform corresponding to CL2, illustrating clock pulses 30. It will be appreciated that the video pulses 28 are wider than the pixel clock signal pulses and are clocked out under control of the pixel clock signal. These waveforms are representative of those available in the prior art circuit of FIG. 1.

Figure 3:
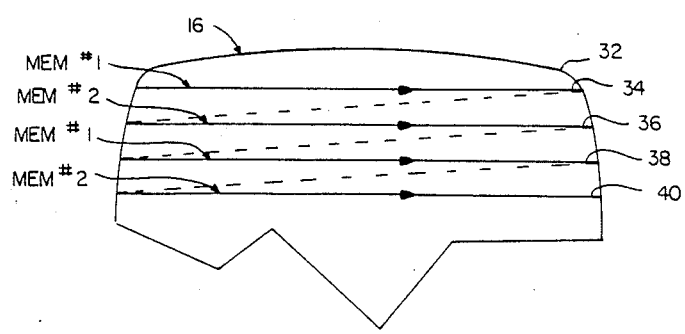
FIG. 3 is a partial depiction of a CRT faceplate illustrating operation of the invention.

In FIG. 3, a portion of the target of a faceplate 32 in CRT 16 is illustrated with four scan lines 34, 36, 38 and 40 illustrated thereon. Assuming that scanning is in the direction indicated by the arrows, that is, from left to right in the FIGURE, the uppermost scan line 34 is identified as having video data supplied from memory #1 and the uppermost dashed line from the right side to the left side of faceplate 32 indicates the return path of the electron beam in the CRT. The next scan line 36 is indicated as having video data supplied from memory #2. Similarly, alternate scan lines have video data supplied from the two different memories with scan line 38 being associated with memory #1 and scan line 40 being associated with memory #2. What is not shown but what will be apparent hereinafter, is that while memory #1 is providing the video data for modulating the electron beam in CRT 16, memory #2 is having a line of video data sequentially written therein from source 10. Similarly, when memory #2 is supplying a line of stored video data for modulating the CRT beam, memory #1 is having the next line of video data written therein from the source. This arrangement permits non-critical timing in the video data transfer and display and significantly simplifies the circuit design. As will be seen, the logic devices incorporated also lend themselves to integrated circuit design. While the memory implementation may be in the form of a pair of shift registers, for example, it may also be in the form of a RAM which is sequentially addressed. Consequently, a great deal of flexibility is obtained.

Figure 4:
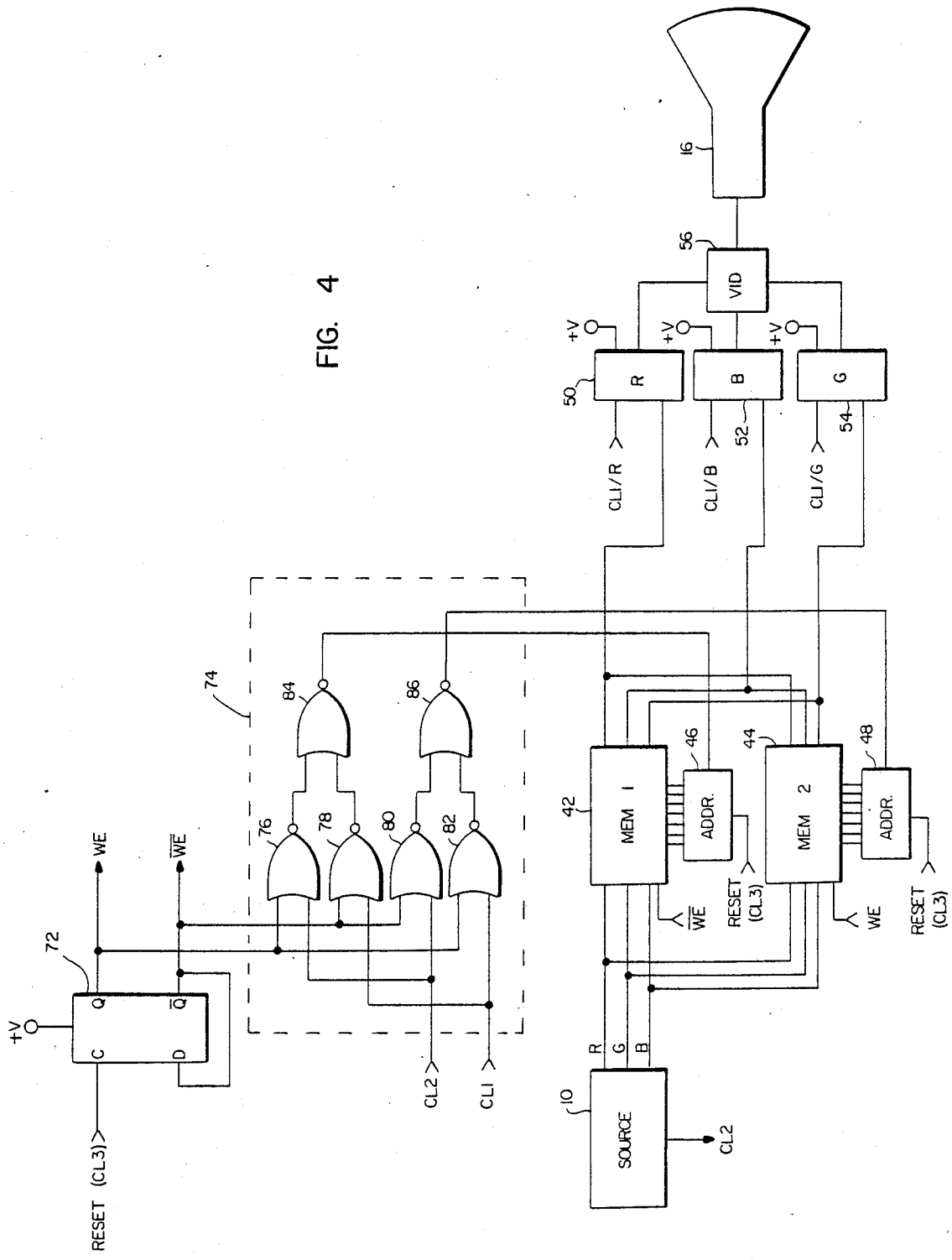
FIG. 4 is a schematic diagram of the circuit arrangement of the invention.

In the schematic diagram of FIG. 4, source 10 supplies RGB signals to both memory 42 and memory 44 with memory 42 being identified as memory #1 and memory 44 being identified as memory #2. Addressing means 46 and 48 are respectively coupled to memories 42 and 44 for sequentially accessing or addressing the memory cells therein. The determination of whether the memory is in a write mode or in a read mode is made by a write enable (WE) signal. The high or normal value of the write enable signal is indicated by WE and the low or opposite value of the write enable signal is indicated by e,ovs/WE/ . Addressing means 46 and 48 include a terminal that is supplied with a reset signal for initiating their operation. The reset signal is a line sync reset and is in time phase with CL3 as indicated by (CL3) in the legend. The outputs of memories 42 and 44 are supplied to an R flip-flop 50, a B flip-flop 52 and a G flip-flop 54, which are all operated under control of the clock signal CL1, which it will be recalled in the index clock. Since the RGB data is applied sequentially to the CRT, the CL1 pulse is used to control clocking of the data. Thus three pulses that are derived from CL1 and phased with respect thereto are developed. They are indicated as CL1/R, CL1/B and CL1/G. Flip-flops 50, 52 and 54 accept data on alternate lines from memory 42 and memory 44 and apply it to a video circuit 56, which typically includes a mixer and an amplifier. Video circuit 56 sequentially supplies the video information to the appropriate electrode in color CRT 16. As explained, the data is released under control of the index signal (specifically, CL1/R, CL1/B and CL1/G) to assure that the proper color data is applied to the electron gun when the beam is positioned to impact a corresponding color phosphor stripe.

The WE and $\overline{\text{WE}}$ signals are toggled by a flip-flop toggle circuit 72 and in turn control a synchronizing switching circuit 74 which applies the correct timing clock pulses to the addressing means for the memories, depending upon whether the memory is being written into from source 10 or read out of for display on CRT 16. A reset (CL3) signal is applied to the C input of flip-flop 72 that generates the WE signal at its Q output and the $\overline{\text{WE}}$ at its $\overline{\text{Q}}$ output. Thus We and $\overline{\text{WE}}$ go alternately high and low under control of line sync pulse CL3. These signals are applied to switch circuit 74 which consists of a plurality of NOR gates 76, 78, 80, 82, 84 and 86 arranged to alternately apply clock signals CL1 and CL2 to addressing means 46 and 48 under control of the WE signal. Thus the memories are alternately switched from writing information from source 10 to reading out information to the RGB flip-flops under control of the WE signal. This arrangement permits non-critical timing between the source clock and the index clock and utilizes logic blocks that are readily fabricated in integrated circuit form.

The circuit should be understood to the representative only and numerous changes and modifications in the described preferred embodiment may be made without departing from the spirit and scope of the invention. The invention is to be limited only as defined in the claims.

What is claimed is:

1. In a beam index system of the type including a source of video data coupled to a memory for storing a line of data from said source and supplying the stored line of data under control of an index signal for display on the CRT, the improvement comprising:
   a second memory for storing a line of video data and switch means for alternately operating the memories to store a line of video information from said source and to provide a line of video information for display on said CRT.

2. The system of claim 1 wherein said memories are in the form of serially addressed shift registers.

3. The system of claim 2, further including toggle means for alternately controlling operation of said memories, said toggle means comprising a plurality of NOR gates.

4. The system of claim 3 wherein said source provides a timing signal and wherein said toggle means also couples said timing signal and said index signal alternately to control said memories.

5. A beam index system comprising:
- a source of video data;
- first and second memory means coupled to said source of video data;
- a CRT coupled to said memory means for display of data supplied therefrom;
- an index signal for controlling transfer of data from said memory means to said CRT; and
- switching means for selectively operating said first and said second memory means to alternately store a line of data from said source and to supply a line of data for display by said CRT.

* * * * *